(12) United States Patent
Tureček

(10) Patent No.: US 9,411,373 B2
(45) Date of Patent: Aug. 9, 2016

(54) ARRANGEMENT OF PORTABLE DISPLAY SYSTEM FOR RADIATION DETECTION

(71) Applicant: Daniel Tureček, Vsetín (CZ)

(72) Inventor: Daniel Tureček, Vsetín (CZ)

(73) Assignee: INSTITUTE OF EXPERIMENTAL AND APPLIED PHYSICS, CZECH TECHNICAL UNIVERSITY IN PRAGUE, Prague (CZ)

( * ) Notice: Subject to any disclaimer, the term of this patent is extended or adjusted under 35 U.S.C. 154(b) by 50 days.

(21) Appl. No.: 14/622,524

(22) Filed: Feb. 13, 2015

(65) Prior Publication Data

US 2015/0234428 A1 Aug. 20, 2015

(51) Int. Cl.
 *G06F 1/16* (2006.01)
 *G01T 7/00* (2006.01)

(52) U.S. Cl.
 CPC ............... *G06F 1/1637* (2013.01); *G01T 7/00* (2013.01)

(58) Field of Classification Search
 CPC ............................ H05K 7/023; H05K 7/20545
 USPC .......................... 361/679.26, 679.08, 679.47;
 365/185.11, 191, 189.17; 455/66.1, 73,
 455/343.5, 67.12, 41.2, 456.45, 403;
 439/656, 39, 493, 108; 165/80.1, 80.3
 See application file for complete search history.

(56) References Cited

U.S. PATENT DOCUMENTS

| | | | |
|---|---|---|---|
| 5,181,167 A * | 1/1993 | Davidson | H05K 7/023 165/80.3 |
| 8,111,516 B2 * | 2/2012 | Goldrian | H05K 7/20545 165/80.1 |
| 2004/0149918 A1 | 8/2004 | Craig et al. | |
| 2006/0028305 A1 * | 2/2006 | Dutta | H01P 3/084 333/328 |
| 2009/0012745 A1 | 1/2009 | Longman et al. | |

FOREIGN PATENT DOCUMENTS

WO 2014021731 A1 6/2014

* cited by examiner

*Primary Examiner* — Hung Duong
(74) *Attorney, Agent, or Firm* — Avery N. Goldstein; Blue Filament Law PLLC

(57) ABSTRACT

Arrangement of a portable display System for radiation detection, includes an adaptation board (3) with minicomputer (4) including a processor (43), while the adaptation board (3) is connected via the earth connector (31) and signal connector (33) with at least one radiation detector (1) arranged on the stack board (2) and connected via signal connector (33) by pins to the interconnection (5), while the adaptation board (3) itself is connected with the mini computer (4) by pins of the interconnection (5).

3 Claims, 4 Drawing Sheets

ARRANGEMENT OF PORTABLE DISPLAY SYSTEM FOR RADIATION DETECTION

TECHNICAL FIELD

Figure 1:
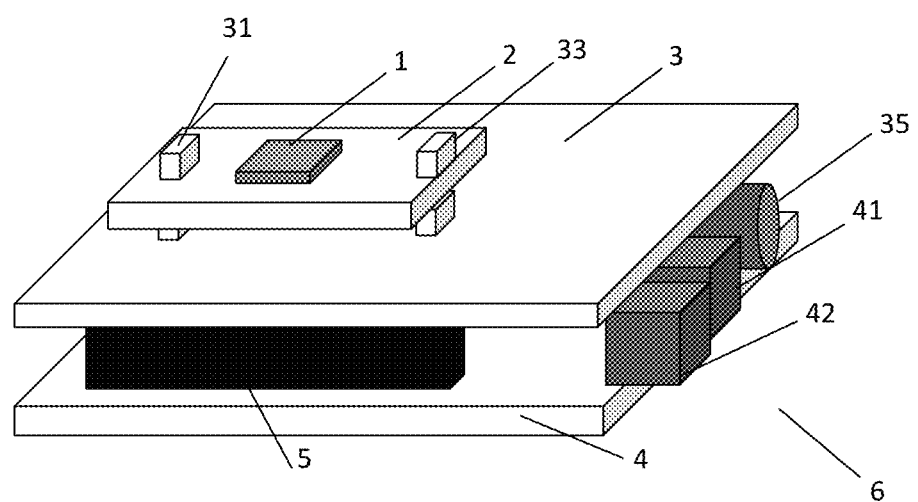

The invention relates to arrangement of a portable display system for radiation detection.

TECHNICAL BACKGROUND

Up to now, there are known several devices able to communicate with a radiation detector of radiation known under the "Timepix" marking. All the devices are designed only for reading from an instrument that must be connected to a PC. A device allowing reading from an instrument in connection with a computer is known under the "FITPix" marking. The device was developed in the Institute of Technical and Experimental Physics, Czech Technical University in Prague. This device controls and reads data from radiation detectors of radiation "Timepix". And it can be connected to a PC using the USB connector. It contains a programmable logic array providing communication to and between the computer and the detector. More, it arranges other technical support of the detector (power sources, convertors of voltage levels, etc.). The "FITPix" device allows data reading from radiation detectors reaching the speed of as many as 80 frames per second. The device does not work independently; it must always be connected to a computer and to be controlled by service software. Another device known under the "Timepix Single" (STPX-65K) marking was developed by the company Amsterdam Scientific Instruments. Just like the "FITPix" device, even this device must be connected to a computer, to be controlled by service software. It also contains the programmable logic array and necessary support for the radiation detector. The device is connected by a standard internet cable (cross UTP cable) directly to the computer or to the network infrastructure. The device allows reading of data from radiation detectors with the speed of as many as 120 frames per second.

INVENTION BACKGROUND

The invention solves arrangement of a portable display system for detection of radiation including a radiation detector, which can be connected to public network and thus allows communication with relevant central server containing the database, all of that via the network.

The above stated inadequacies of existing devices are eliminated by arrangement of the portable display system for radiation detection, based on the fact that it consists of an adaptation board with minicomputer including a processor, while the adaptation board is connected via the earth connector and signal connector with at least one radiation detector arranged on a stack board and connected via the signal connector by pins to the interconnection, while the adaptation board itself is connected with the minicomputer by pins of the interconnection.

The main advantage compared to current systems is the possibility of using a minicomputer built-in directly in the device. That significantly extends the possibilities of connection and use of the device.

The minicomputer contains all and any logics of the device from low level communication with the radiation detector, data reading from the detector, pre-processing and analysis of the data up to their visualisation by users. Modern minicomputers also include several peripherals allowing connection with the surrounding world. Advantageously, the processor used in the minicomputer may be of the ARM type.

The described arrangement of the display system for radiation detection use two such peripherals—the Ethernet interface and the USB interface. It is possible to connect a generally available USB Wi-Fi adaptor to the USB interface, extending the device in the possibility of connection to wireless networks Wi-Fi. More, if the system is connected to a battery, it may operate on fully autonomous basis and it can be wireless-controlled thanks to the Wi-Fi adaptor. This is the main advantage of the system.

Software saved in the minicomputer memory and being a part of the system provides for communication with the radiation detector "Timepix" as well as it creates a web interface that may be used to control the whole system. Thanks to the web interface and the wireless connection, it is possible to control the system from any wireless device, which is able to display web sites (computer, cell phone, tablet, etc.). The web interface allows setting of all parameters of the radiation detector as well as of measurements, and it also visualises the current measured data supplied from the radiation detector. It can also display a spectrum of measured radiation as well as a corresponding statistics (e.g. number of various particles). The measured data can be saved directly in the internal memory of the minicomputer or possibly on the connected USB disc and/or they can be sent via the Internet to a shared disc or central data server. Data can be downloaded from the system via integrated FTP server.

The construction of individual parts of the system allows operation of one or more radiation detectors of "Timepix" type at once. The detectors of radiation can be interconnected by connectors. Such connection is allowed by the use of special chip boards with connected "Timepix" detectors of radiation. The boards are equipped with connectors on both sides and so it is possible to interconnect them in a stack of layers one above each other. The maximal number of frames that the device can read is 15 per second.

LIST OF FIGURES IN DRAWINGS

The invention is explained by enclosed drawings, where

Figure 2:
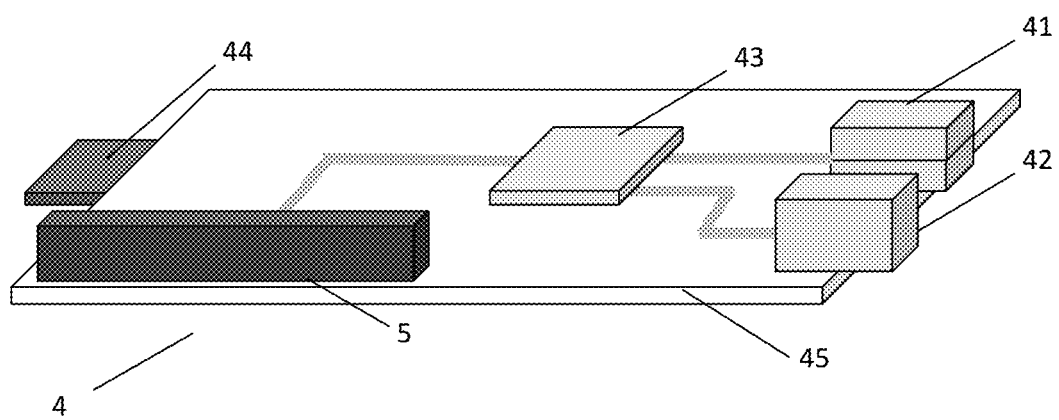
Figure 3:
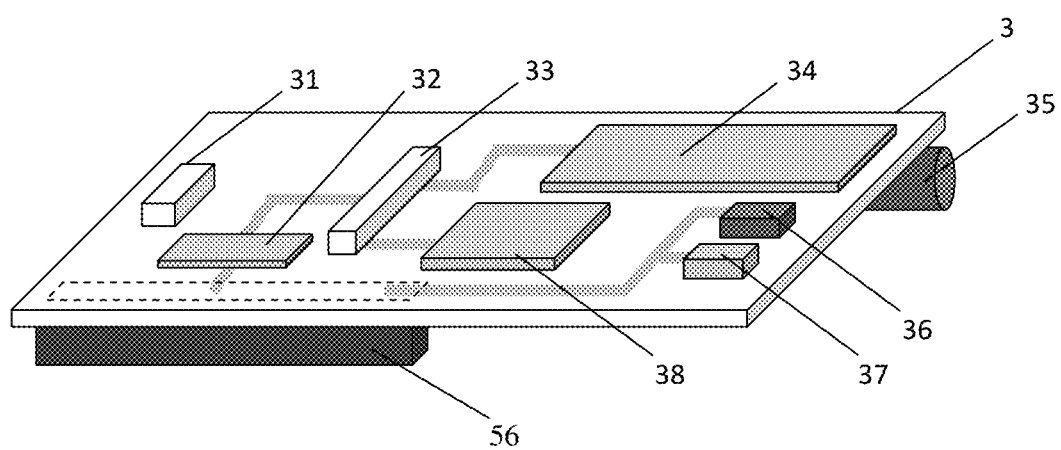
Figure 4:
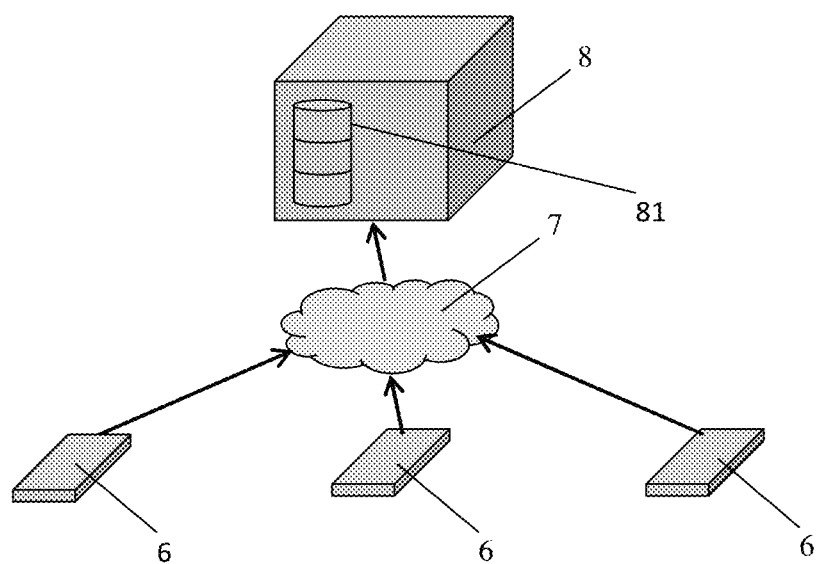

FIG. 1 shows the scheme of main blocks of the portable display system for radiation detection, FIG. 2 shows the scheme of a minicomputer, FIG. 3 shows the scheme of the adaptation board with interconnection of individual parts and FIG. 4 shows the arrangement of individual system connected in the monitoring network of radiation monitors.

SAMPLE INVENTION ARRANGEMENT

The following text describes the arrangement of portable display system for radiation detection.

The display system for radiation detection known under the "Raspix" consists of two main parts—the adaptation board 3 and minicomputer 4 equipped with a processor, as shown in FIG. 1.

As can be seen in FIG. 1, the adaptation board 3 is connected by an earth connector 31 (e.g. DF12) and signal connector 33 (e.g. DF12) to the radiation detector 1 arranged on a stack board 2. The adaptation board 3 itself is connected with the minicomputer 4 via pins of the connection 5 (e.g. GPIO—General Purpose Input/Output).

The adaptation board 3 in this version contains the voltage source N for the radiation detector 1 and high voltage source 38 (bias voltage) for the sensor of the radiation detector 1. Moreover, it contains convertors 32 CMOS of voltage levels to differential current transfer LVDS and ground connector 31 and signal connector 33 for connection of the radiation detector 1 arranged on the stack board 2. By means of stack boards 2, containing connectors (e.g. of the type DF12) arranged on both sides of the stack board 2, it is possible to connect several radiation detectors 1 one above the other. The radiation detectors 1 are then connected in a loop in such way that the output of the first radiation detector 1 is connected to the input of the next radiation detector 1 and the output of the last radiation detector 1 is connected to the interconnection 5 of the adaptation board 3. The adaptation board 3 itself is connected with the minicomputer 4 using the interconnection 5. The individual circuits and parts arranged on the adaptation board 3 including the radiation detector 1 are connected to individual pins of the interconnection 5 (e.g. GPIO—General Purpose Input/Output) and so directly to the bus bar of the minicomputer 4.

The scheme of the adaptation board 3 is shown in FIG. 3. The adaptation board 3 in this version includes the voltage source 34 for the radiation detector 1 of radiation, which is connected via the signal connector 33 to the interconnection 5. Moreover, the adaptation board 3 contains the high voltage source 38 (bias voltage), connected to the interconnection 5 as well as to the signal connector 33 of the detector. The radiation detector 1 is connected via the convertor 32 of levels to pins of the interconnection 5. The LED diode 36 and turn-off switch 37 are also connected to the interconnection 5.

The scheme of the minicomputer 4 (specifically Raspberry Pi) is shown in FIG. 2. The minicomputer 4 in this version contains the processor 43 with integrated graphic chip, two USB ports 41, to which a Wi-Fi module can be connected, one Ethernet port 42 designed for connection to communication network 7 by cable, slot 44 for the SD flash card, containing the operation system Linux and service software, and the interconnection 5 for general use.

The operation system Linux running on the minicomputer 4 arranges basic operations of the minicomputer 4 (e.g. it administrates peripheries of the minicomputer 41, it arranges network connection via Ethernet or Wi-Fi connection, it administrates saving and reading of files from the SD flash card, and it allows an access of the application software to other peripherals of the minicomputer 4, like the adaptation board 3, which is connected to the interconnection 5. Made-to-measure software/firmware was written for the operation system which contains two parts—low-level library and web user interface. The low-level library written in C++ controls via the peripherals the minicomputer 4 and the adaptation board 3 and so even the radiation detector 1. For a transfer of the data between the minicomputer 4 and the radiation detector 1 the internal SPI interface (Serial Peripheral Interface) of the minicomputer 4 which is connected to the pins of the interconnection 5. The other circuits on the adaptation board 3 are directly controlled by change of voltage levels on the pins of the interconnection 5. The software sets all the parameters of the radiation detector 1, performs measuring and reading of the data from the radiation detector 1 to the memory of the minicomputer 4, where they data are pre-processed and converted to the matrix of 256×256 pixels. Data in this form can be stored or displayed by a user.

The second part of the application, which is written in Python performs communication with a user via the web interface. The application actually works as a web server 8, providing individual web sites, which visualise data, inform about measuring conditions and allow for the parameters of measuring and radiation detector 1 to be changed. Based on the fact that the application provides the web interface, it can be controlled from any web browser. As the system may be connected to the communication network 7 by a cable via the Ethernet interface or on wireless basis via the Wi-Fi interface, it is possible to control the application from any device containing a web browser and it allows connection to the communication network 7 (wire, wireless). This requirement is met by a majority of personal computers, notebooks, tablets and smart cell phones. As the communication network 7, a local network, or even the Internet can be used. In this way, the device can be controlled and operated from its vicinity, e.g. from a mobile phone, as well as remotely, e.g. via the Internet.

The application also allows data analysis. As in measured frames traces of individual particles can be recognized, then for each measured frame a statistics of detected individual particle types can be evaluated. It is also possible to analyse the energies of all detected particles by the radiation detector 1, what can be used for particles energy spectrum creation. The results of all the analyses are then available to users in a form of graphs and tables through web interface of the application.

Thanks to information on energy spectrum of the incident radiation it is possible to use the device as a radiation monitor 6. The measured frames can be saved in memory of the minicomputer 4 and then read and sent for further processing, or the system itself can send frames via the TCP/IP protocol directly to the central server 8 with database 81. Based on connection of several such radiation monitors 6, a monitoring network of radiation monitors 6, can be set up, as it can be seen in FIG. 4.

Another application runs on central server 8 with database 81 receiving frames from individual radiation monitors 6 and saves them in the database 81. Every frame is analysed to obtain information on number and energy of detected particles. This information is also saved in the database 81. The server application as well as the application in the system implements the web interface, which allows to display the measured data of number of detected particles and their energies in a form of graphs and tables containing particle statistics data in dependence on time.

INDUSTRIAL APPLICABILITY

The portable display system for radiation detection may be used as a radiation monitor or a radiation camera.

LIST OF RELATION MARKS

1—radiation detector (detector of radiation)
2—stack board
3—adaptor board
31—earth connector (DF12)
32—convertor CMOS of voltage levels to differential current transfer LVDS
33—signal connector (DF12)
34—source of voltage for detector
35—feeding connector (0-24 V)
36—diode LED
37—turn-off switch
38—high voltage source (bias voltage) for the detector
4—minicomputer
41—two USB ports
42—Ethernet port
43—processor
44—slot for SD flash card
45—base board
5—interconnection (interconnector)
6—radiation monitor (detector)

7—communication network
8—central server
81—database

The invention claimed is:

1. Arrangement of a portable display system for detection of radiation, characterised by the fact that it consists of adaptation board (3), base board (45) with a mini computer (4) including a processor (43) and at least one stack board (2) with radiation detector (1), while the adaptation board (3) is connected via earth connector (31) and signal connector (33) to the radiation detector (1) of radiation arranged on the stack board (2), connected via the signal connector (33) by pins to the interconnection (5), while the adaptation board (3) itself is connected with the mini computer (4) by pins of the interconnection (5).

2. Arrangement of a portable display system for detection of radiation, according to claim 1, characterised by the fact that the adaptation board (3) includes the voltage supply (34), which is connected via the signal connector (33) to the interconnection (5), while the adaptation board (3) also includes the high voltage supply (38) connected to the signal connector (33) and the adaptation board (3) also include the turn-off switch (37) and the LED diode (36), connected to individual pins of the interconnection (5).

3. Arrangement of a portable display system for detection of radiation, according to claim 1, characterised by the fact that the mini computer (4) contains the processor (43) with graphic chip, arranged on the base board (45), connected to at least one USB port (41), to Ethernet port (42) as well as to the interconnection (5), while the base board (45) includes a slot (44) for the SD flash card, containing the operation system Linux and service software.

\* \* \* \* \*